United States Patent
Kennedy et al.

(10) Patent No.: US 11,787,533 B2
(45) Date of Patent: Oct. 17, 2023

(54) ROTOR ASSEMBLIES FOR ROTORCRAFT

(71) Applicant: The Boeing Company, Chicago, IL (US)

(72) Inventors: Dennis K. Kennedy, Mesa, AZ (US); Joshua Jeffrey Bracken, Gilbert, AZ (US); Jeffrey L. Sorensen, Fountain Hills, AZ (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/326,222

(22) Filed: May 20, 2021

(65) Prior Publication Data

US 2022/0144418 A1     May 12, 2022

Related U.S. Application Data

(60) Provisional application No. 63/112,446, filed on Nov. 11, 2020.

(51) Int. Cl.
| | | |
|---|---|---|
| *B64C 27/39* | (2006.01) | |
| *B64C 27/35* | (2006.01) | |
| *B64C 27/48* | (2006.01) | |

(52) U.S. Cl.
CPC .............. *B64C 27/39* (2013.01); *B64C 27/35* (2013.01); *B64C 27/48* (2013.01)

(58) Field of Classification Search
CPC .......... B64C 27/35; B64C 27/39; B64C 27/48
See application file for complete search history.

(56) References Cited

U.S. PATENT DOCUMENTS

| | | |
|---|---|---|
| 3,520,637 A | 7/1970 | Tobey |
| 4,543,040 A * | 9/1985 | McArdle ................ B64C 27/32 |
| | | 416/134 A |
| 4,859,148 A | 8/1989 | Hibyan |
| | (Continued) | |

FOREIGN PATENT DOCUMENTS

WO     WO2016/201079 A1     12/2016

OTHER PUBLICATIONS

European Patent Office, Extended European Search Report for related European Patent Application No. 21186242, dated Jan. 4, 2022.

*Primary Examiner* — Courtney D Heinle
*Assistant Examiner* — John S Hunter, Jr.
(74) *Attorney, Agent, or Firm* — Kolitch Romano Dascenzo Gates LLC (57) ABSTRACT

A rotor assembly comprises a rotor hub and rotor-blade assemblies. The rotor hub comprises rotor-blade supports. Each rotor-blade assembly is coupled to a respective one of the rotor-blade supports and comprises a flap axle, a hub connector, a rotor blade, and a torsion strap. The flap axle extends through a respective one of the rotor-blade supports and has a central flap-axle axis. The hub connector is pivotable relative to a rotor-blade support about the central flap-axle axis and defines a central hub-connector axis. The rotor blade is coupled to and is pivotable relative to the hub connector, and, together with the hub connector, is pivotable relative to a respective one of the rotor-blade supports about the central flap-axle axis. The torsion strap has a first end, coupled to the rotor blade, and a second end, through which the flap axle passes.

20 Claims, 8 Drawing Sheets

(56) References Cited

U.S. PATENT DOCUMENTS

| | | | |
|---|---|---|---|
| 7,559,743 B2 * | 7/2009 | Jalaguier | B64C 27/39 416/134 A |
| 8,500,407 B1 * | 8/2013 | Kennedy | B64C 27/48 416/209 |
| 2009/0136351 A1 | 5/2009 | Muylaert et al. | |

* cited by examiner

ROTOR ASSEMBLIES FOR ROTORCRAFT

RELATED APPLICATION

The present application is a non-provisional application claiming priority to U.S. Provisional Patent Application No. 63/112,446, filed on Nov. 11, 2020, entitled "ROTOR ASSEMBLIES FOR ROTORCRAFT," the complete disclosure of which is incorporated by reference.

GOVERNMENT RIGHTS

This invention was made with Government support under W911W6-19-9-0003 awarded by US Army Aviation Development Directorate. The government has certain rights in this invention.

FIELD

The present disclosure relates to rotor assemblies for rotorcraft.

BACKGROUND

Helicopters typically comprise a main rotor and a tail rotor. Both rotors are complex assemblies, having rotor blades, each typically configured to be controllably pitched (i.e., rotated about an axis, substantially perpendicular to the rotor's rotation axis) and to passively flap (deflect back and forth along a plane, containing the rotor's rotation axis—i.e., out of the plane, within which the rotor blades rotate). Traditionally, rotors comprise thrust and pitch bearing joints, which require periodic lubrication.

SUMMARY

Accordingly, apparatuses and methods, intended to address at least the above-identified concerns, would find utility.

The following is an example of the subject matter, disclosed herein.

Disclosed herein is a rotor assembly for a rotorcraft. The rotor assembly comprises a rotor hub and rotor-blade assemblies. The rotor hub comprises rotor-blade supports. Each of the rotor-blade assemblies is coupled to a respective one of the rotor-blade supports. The rotor hub has a rotation axis about which the rotor hub has a rotational symmetry of order N. The rotor-blade supports are N in number. Each of the rotor-blade assemblies comprises a flap axle, a hub connector, a rotor blade, and a torsion strap. The flap axle extends through a respective one of the rotor-blade supports and has a central flap-axle axis. The hub connector is coupled to a respective one of the rotor-blade supports via the flap axle, is pivotable relative to a respective one of the rotor-blade supports about the central flap-axle axis, and defines a central hub-connector axis that is perpendicular to the central flap-axle axis. The rotor blade is coupled to the hub connector, is pivotable relative to the hub connector about the central hub-connector axis, and, together with the hub connector, is pivotable relative to a respective one of the rotor-blade supports about the central flap-axle axis. The torsion strap has a first end, coupled to the rotor blade, and a second end, through which the flap axle passes.

By having each rotor blade with its own torsion strap, as opposed to a single torsion strap extending between two opposing rotor blades, rotor-blade assemblies, including those with greater than two rotor blades, may include a single rotor hub, with rotor blade assemblies extending from the rotor hub in the same plane. Such a configuration reduces complexity and the envelope, or packaging volume, of the rotor assembly, compared to rotor assemblies in which each opposing pair of rotor blades extends in a distinct plane, as often is the case with tail rotor designs.

BRIEF DESCRIPTION OF THE DRAWINGS

Reference will now be made to the accompanying drawings, which are not necessarily drawn to scale, and where like reference characters designate the same or similar parts throughout the several views. In the drawings.

DESCRIPTION

Figure 1:
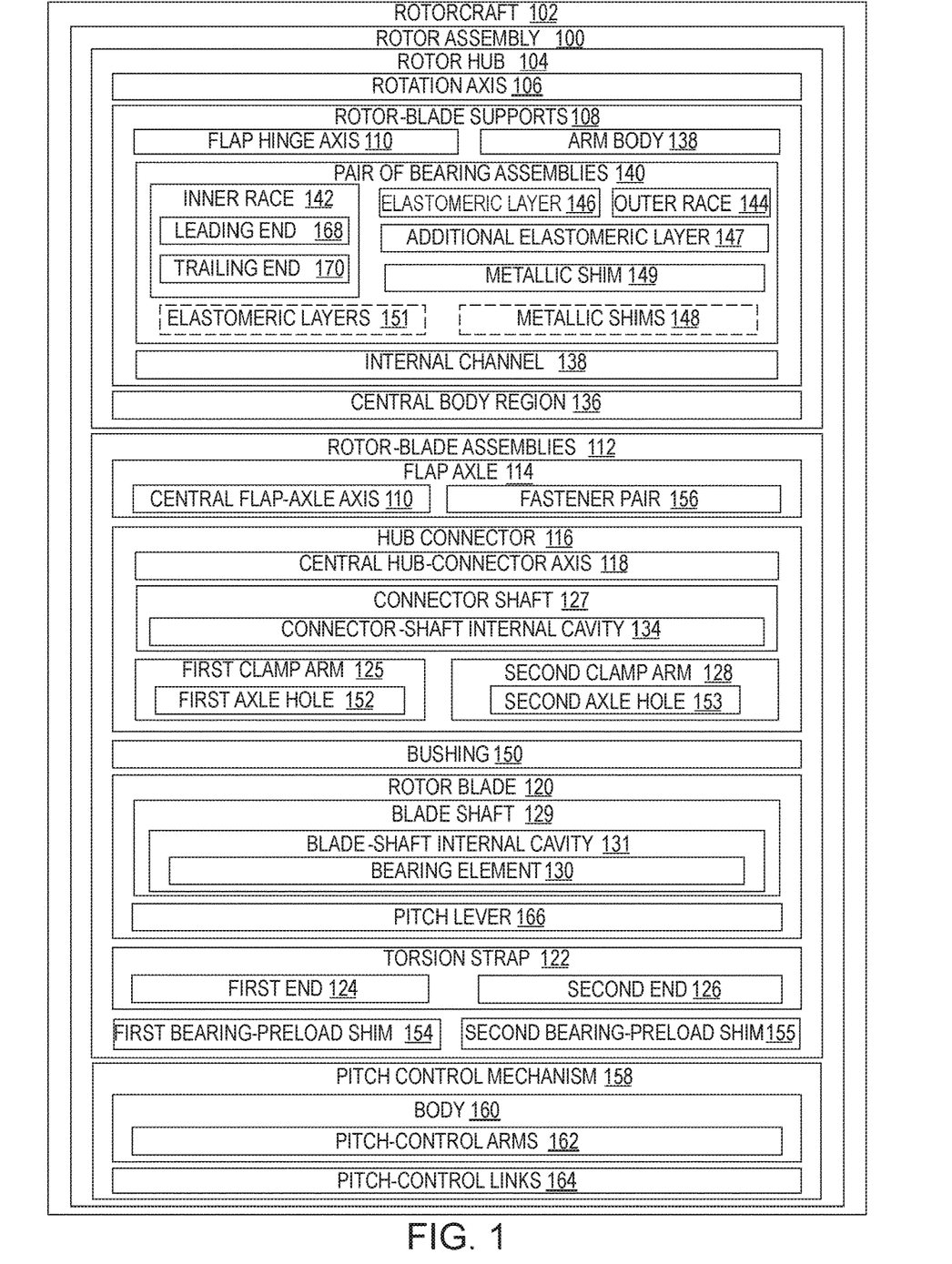
FIG. 1 is a block diagram of a rotor assembly for a rotorcraft, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 7:
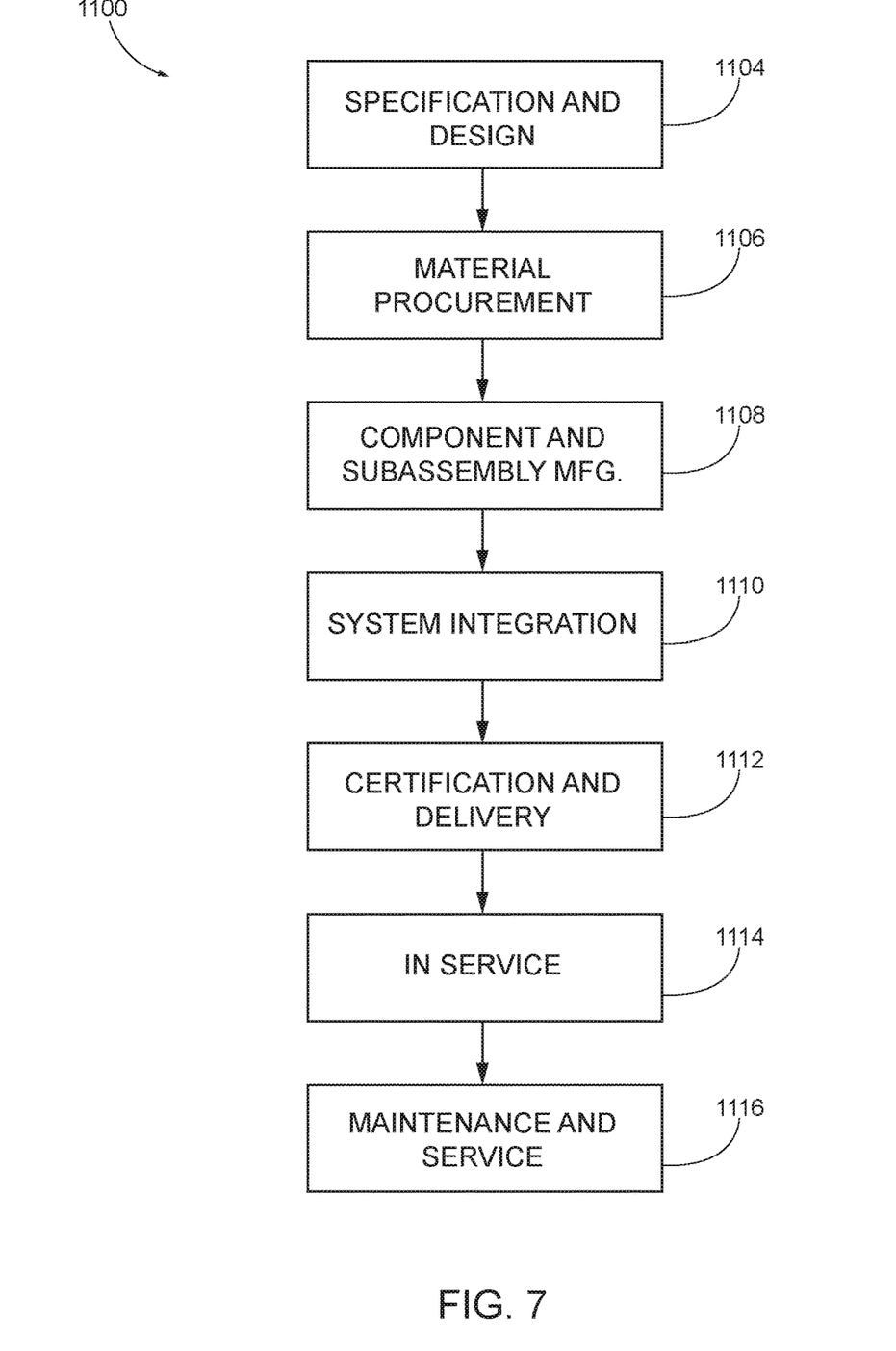
FIG. 7 is a block diagram of aircraft production and service methodology.

In FIG. 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2-6 for illustrative purposes only and not by way of limitation, the following portion of this paragraph delineates example 1 of the subject matter, disclosed herein. According to example 1, rotor assembly 100 for rotorcraft 102 comprises rotor hub 104 and rotor-blade assemblies 112. Rotor hub 104 comprises rotor-blade supports 108. Each of rotor-blade assemblies 112 is coupled to a respective one of rotor-blade supports 108. Rotor hub 104 has rotation axis 106, about which rotor hub 104 has a rotational symmetry of order N. Rotor-blade supports 108 are N in number. Each of rotor-blade assemblies 112 comprises flap axle 114, hub connector 116, rotor blade 120, and torsion strap 122. Flap axle 114 extends through a respective one of rotor-blade supports 108 and has central flap-axle axis 110. Hub connector 116 is coupled to a respective one of rotor-blade supports 108 via flap axle 114, is pivotable relative to a respective one of rotor-blade supports 108 about central flap-axle axis 110, and defines central hub-connector axis 118 that is perpendicular to central flap-axle axis 110. Rotor blade 120 is coupled to hub connector 116, is pivotable relative to hub connector 116 about central hub-connector axis 118, and, together with hub connector 116, is pivotable relative to a respective one of rotor-blade supports 108 about central flap-axle axis 110. Torsion strap 122 has first end 124, coupled to rotor blade 120, and second end 126, through which flap axle 114 passes.

By having each rotor blade 120 with its own torsion strap, as opposed to a single torsion strap extending between two opposing rotor blades, rotor-blade assemblies 112, including those with greater than two rotor blades, may include a single rotor hub, with rotor-blade assemblies 112 extending from rotor hub 104 in the same plane. Such a configuration reduces complexity and the envelope, or packaging volume, of rotor assembly 100, compared to rotor assemblies in which each opposing pair of rotor blades extends in a distinct plane (e.g., with stacked hubs), as often is the case with tail rotor designs.

In one or examples, central flap-axle axis 110 also is referred to as a flap axis, and central hub-connector axis 118 also is referred to as a rotor-blade pitch axis.

Figure 2:
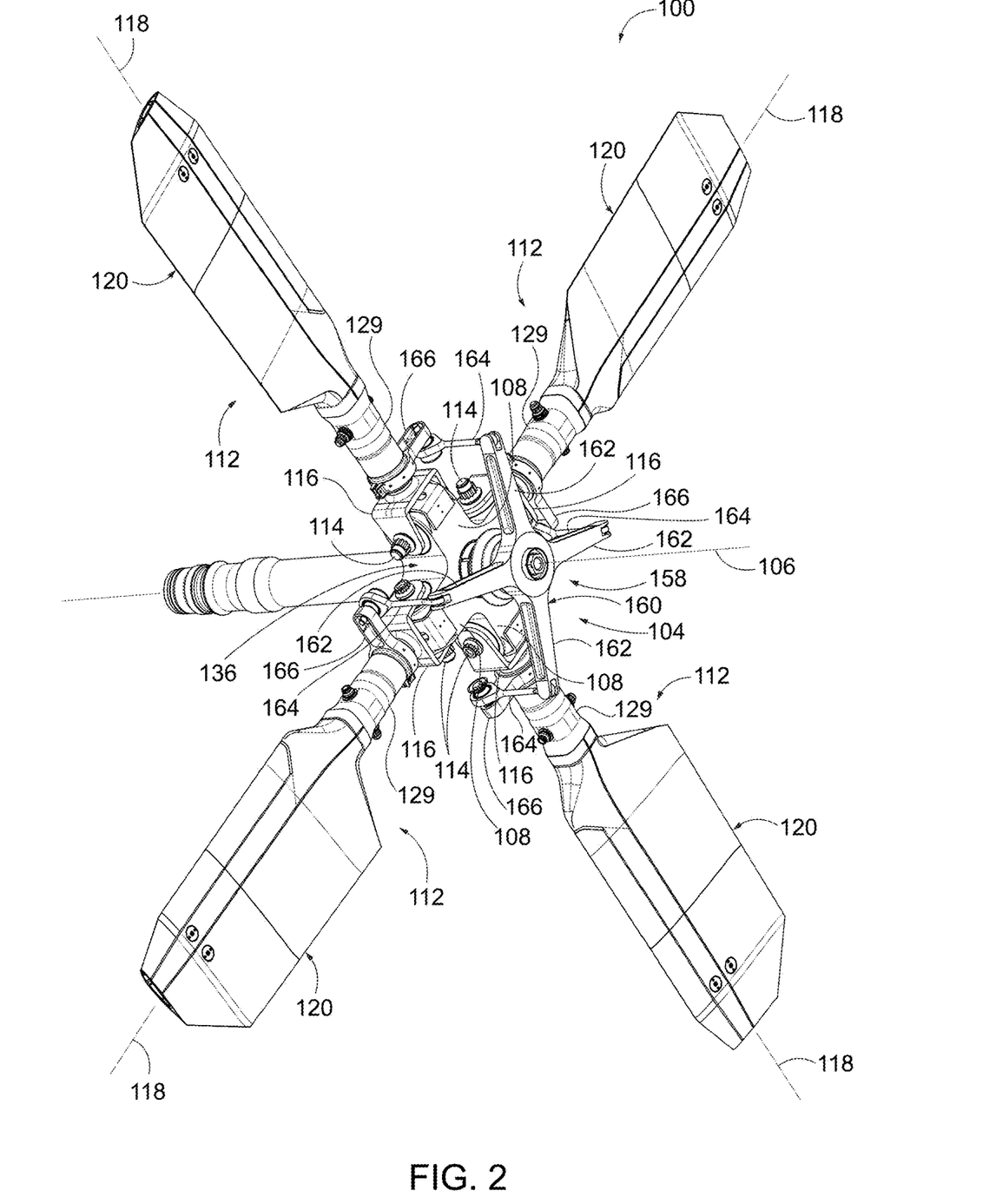
FIG. 2 is a schematic, isometric view of the rotor assembly of FIG. 1, according to one or more examples of the subject matter, disclosed herein.
Figure 3:
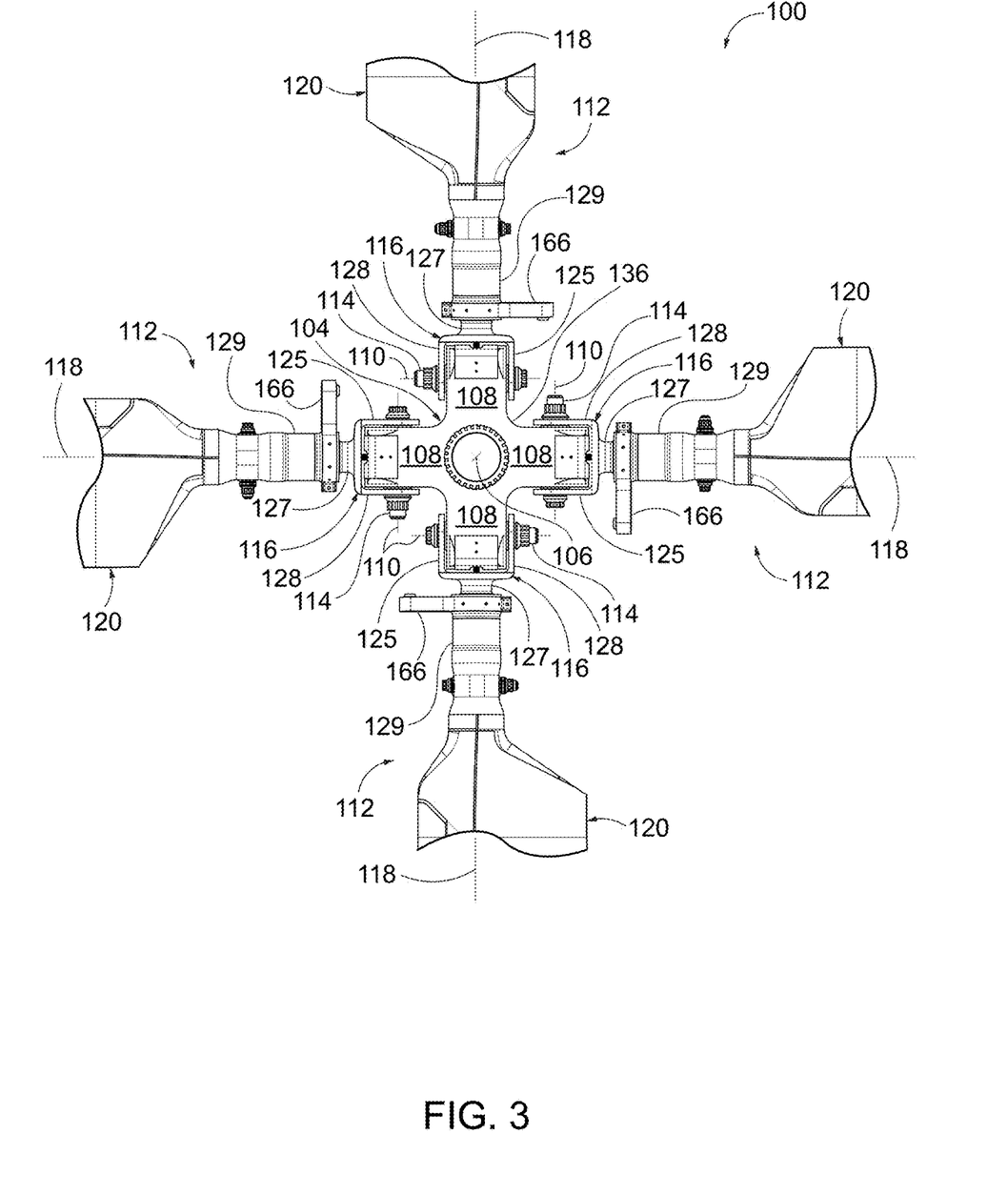
FIG. 3 is a schematic, top, fragmentary view of a portion of the rotor assembly of FIG. 1, according to one or more examples of the subject matter, disclosed herein.

Referring generally to FIG. 1 and particularly to, e.g., FIGS. 2-3 for illustrative purposes only and not by way of limitation, the following portion of this paragraph delineates example 2 of the subject matter, disclosed herein. According to example 2, which encompasses example 1, above, N is an even number.

By having an even number of rotor-blade supports 108, and thus an even number of rotor blades, pairs of rotor blades may be directly across rotor hub 104 from each other, thereby countering, or reacting against, the corresponding centrifugal forces of the rotor blades.

Referring generally to FIG. 1, the following portion of this paragraph delineates example 3 of the subject matter, disclosed herein. According to example 3, which encompasses example 1, above, N is an odd number.

By having an odd number of rotor-blade supports 108, and thus an odd number of rotor blades, rotor assembly 100 may be constructed to be stiff without introducing stability issues that may result from an even number of rotor blades.

Referring generally to FIG. 1 and particularly to, e.g., FIGS. 2-6 for illustrative purposes only and not by way of limitation, the following portion of this paragraph delineates example 4 of the subject matter, disclosed herein. According to example 4, which encompasses any one of examples 1 to 3, above, hub connector 116 comprises connector shaft 127, first clamp arm 125 that extends from connector shaft 127 toward rotor hub 104, and second clamp arm 128 that extends from connector shaft 127 toward rotor hub 104. Rotor blade 120 is pivotable relative to connector shaft 127 about central hub-connector axis 118. Flap axle 114 extends through first clamp arm 125 and second clamp arm 128 of hub connector 116.

Connector shaft 127 facilitates pitch adjustment of rotor blade 120. First clamp arm 125 and second clamp arm 128 facilitate coupling of a respective rotor blade assembly to a respective rotor-blade support of rotor hub 104 via the corresponding flap axle. The relationship of first clamp arm 125 and second clamp arm 128 with flap axle 114 further facilitates flap movement of the corresponding one of rotor-blade assemblies 112.

Figure 5:
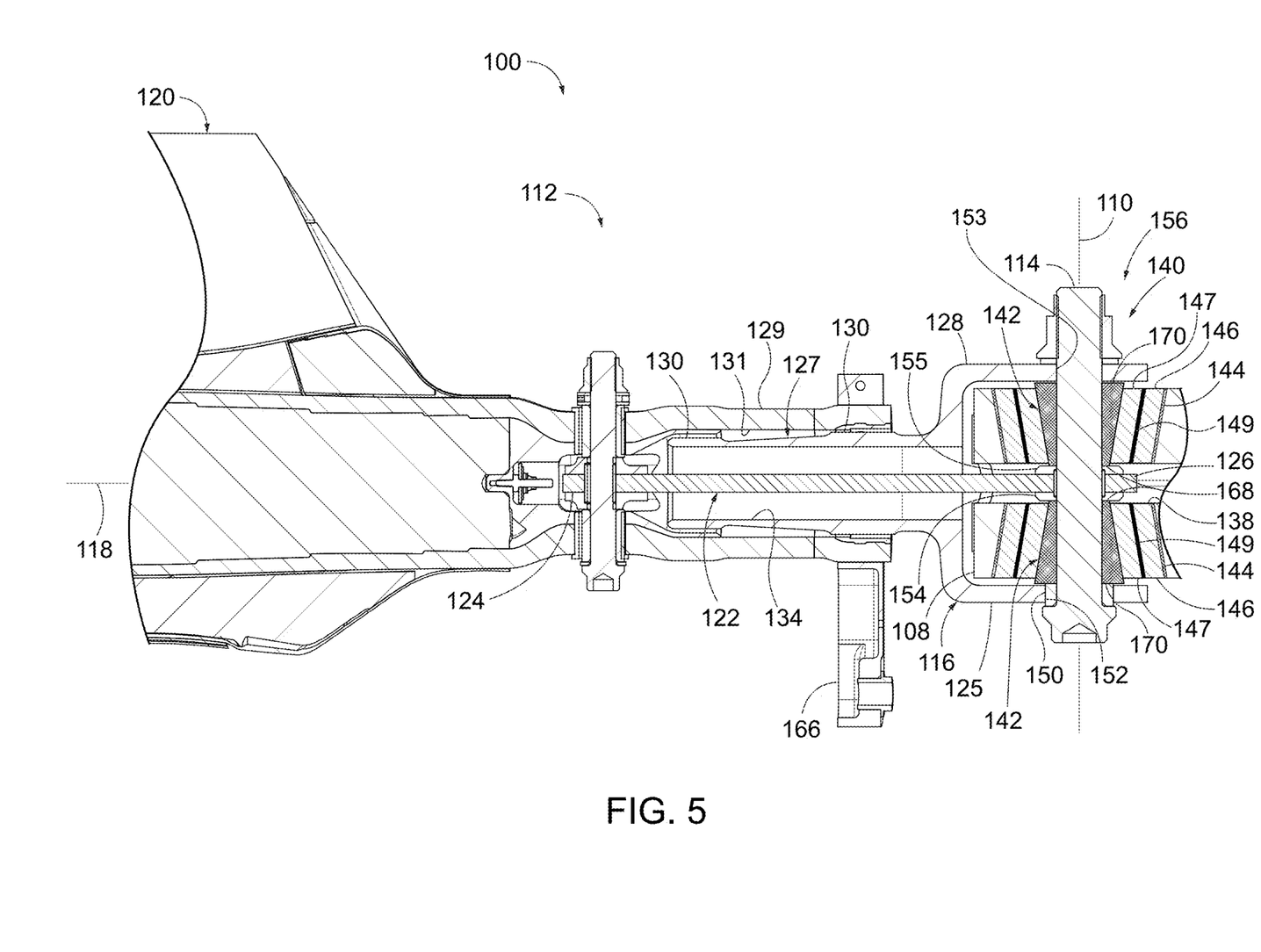
FIG. 5 is a schematic, side, fragmentary, cross-sectional view of a portion of the rotor assembly of FIG. 1, according to one or more examples of the subject matter, disclosed herein.
Figure 6:
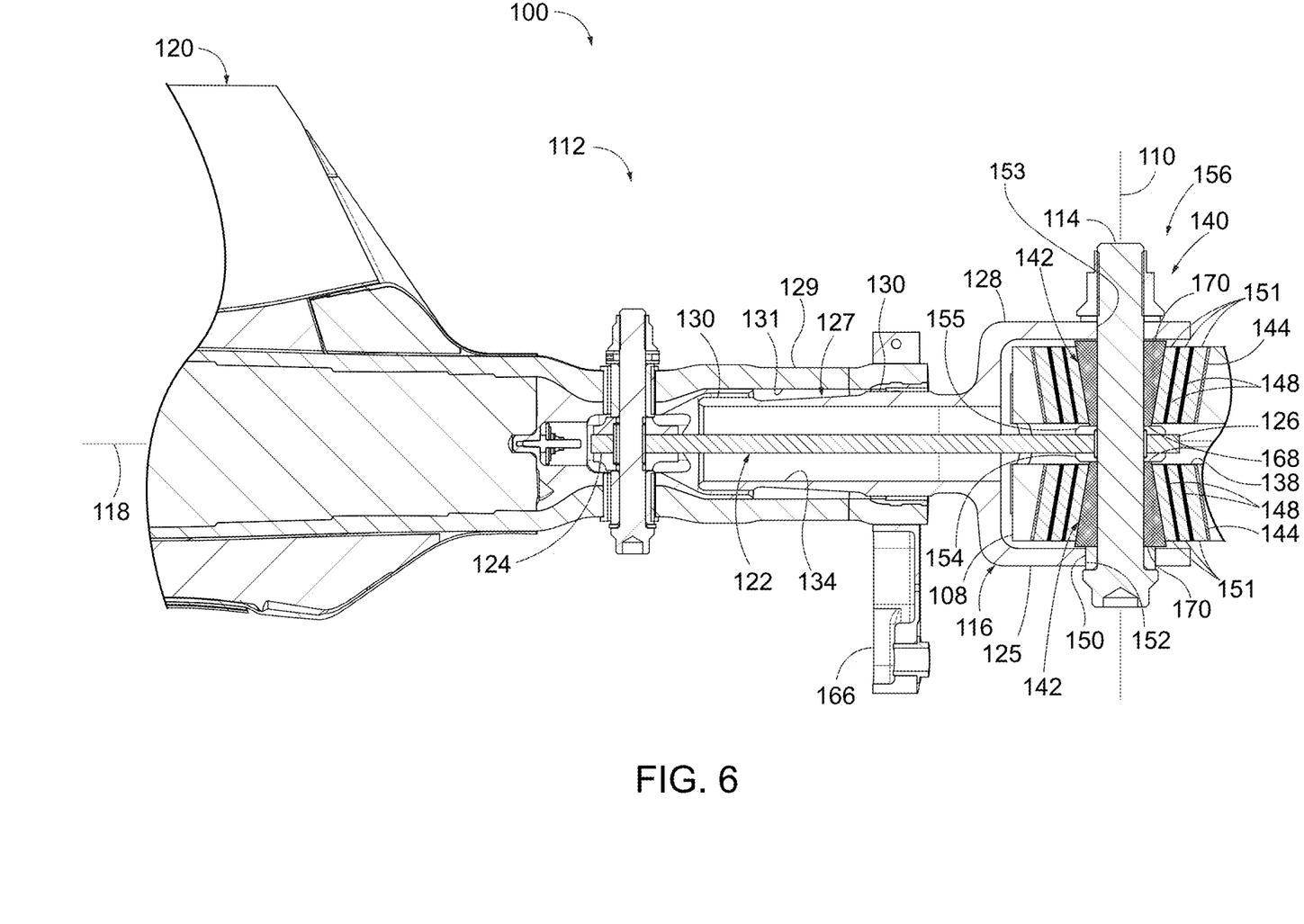
FIG. 6 is another schematic, side, fragmentary, cross-sectional view of a portion of the rotor assembly of FIG. 1, according to one or more examples of the subject matter, disclosed herein.

Referring generally to FIG. 1 and particularly to, e.g., FIGS. 5 and 6 for illustrative purposes only and not by way of limitation, the following portion of this paragraph delineates example 5 of the subject matter, disclosed herein. According to example 5, which encompasses example 4, above, rotor blade 120 comprises blade shaft 129. Blade shaft 129 comprises blade-shaft internal cavity 131. Connector shaft 127 of hub connector 116 is positioned at least partially within blade-shaft internal cavity 131. Blade shaft 129 of rotor blade 120 is pivotable relative to connector shaft 127 of hub connector 116 about central hub-connector axis 118.

By having blade shaft 129 pivotable relative to connector shaft 127, the pitch of the corresponding rotor blade can be adjusted.

Referring generally to FIG. 1 and particularly to, e.g., FIG. 5 for illustrative purposes only and not by way of limitation, the following portion of this paragraph delineates example 6 of the subject matter, disclosed herein. According to example 6, which encompasses example 5, above, blade shaft 129 of rotor blade 120 is pivotally supported relative to connector shaft 127 of hub connector 116 via bearing element 130, located inside blade-shaft internal cavity 131.

Bearing element 130 constrains the pitch movement of the corresponding rotor blade.

Referring generally to FIG. 1 and particularly to, e.g., FIGS. 5 and 6 for illustrative purposes only and not by way of limitation, the following portion of this paragraph delineates example 7 of the subject matter, disclosed herein. According to example 7, which encompasses example 6, above, bearing element 130 comprises two bearing elements, spaced apart from each other along central hub-connector axis 118.

By having spaced-apart bearing elements, the bearing elements counter, or react, torques applied to connector shaft 127 by blade shaft 129, such as a result of flap motion and chord-wise motion of the corresponding rotor blade or undesirable pivotal forces applied by rotor blade 120, such as due to wind or other external forces.

Referring generally to FIG. 1 and particularly to, e.g., FIGS. 5 and 6 for illustrative purposes only and not by way of limitation, the following portion of this paragraph delineates example 8 of the subject matter, disclosed herein. According to example 8, which encompasses any one of examples 4 to 7, above, connector shaft 127 of hub connector 116 defines connector-shaft internal cavity 134. At least a portion of torsion strap 122 is located inside connector-shaft internal cavity 134.

Presence of connector-shaft internal cavity 134 enables torsion strap 122 to extend along central hub-connector axis 118 and thus along the vector of the corresponding centrifugal force resulting from the rotation of the corresponding rotor blade about rotation axis 106.

Figure 4:
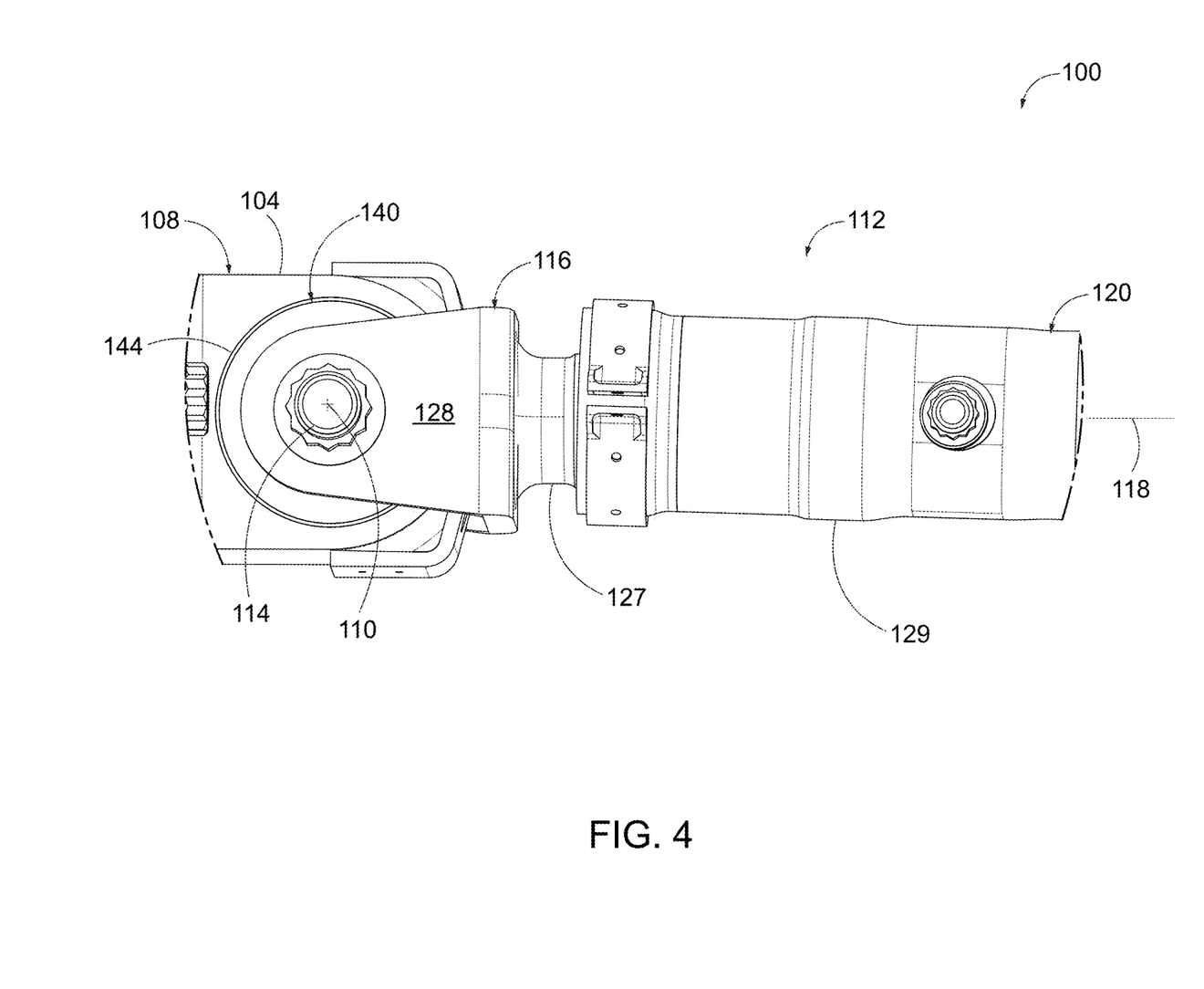
FIG. 4 is a schematic, side, fragmentary view of a portion of the rotor assembly of FIG. 1, according to one or more examples of the subject matter, disclosed herein.

Referring generally to FIG. 1 and particularly to, e.g., FIGS. 4-6 for illustrative purposes only and not by way of limitation, the following portion of this paragraph delineates example 9 of the subject matter, disclosed herein. According to example 9, which encompasses any one of examples 4 to 8, above, each of rotor-blade supports 108 comprises pair of bearing assemblies 140. Flap axle 114 of each of rotor-blade assemblies 112 is received within and supported by pair of bearing assemblies 140 of a respective one of rotor-blade supports 108. Pair of bearing assemblies 140 is configured such that rotation of each of rotor-blade assemblies 112 relative to a respective one of rotor-blade supports 108 about central flap-axle axis 110 is angularly limited.

By limiting the extent of angular rotation of rotor-blade assemblies 112 relative to rotor hub 104, the bearing assemblies limit the available flap motion of the rotor blades relative to rotor hub 104. Moreover, off-the-shelf bearing assemblies may be selected or the bearing assemblies may be customized with a desired limitation of movement between the inner and outer races of the bearing assemblies.

Referring generally to FIG. 1 and particularly to, e.g., FIGS. 4-6 for illustrative purposes only and not by way of limitation, the following portion of this paragraph delineates example 10 of the subject matter, disclosed herein. According to example 10, which encompasses example 9, above, each one of pair of bearing assemblies 140 is an elastomeric bearing assembly.

Elastomeric bearing assemblies have desirable resilient characteristics for limiting flap motion of rotor blades without harsh stops at the full extent of their permitted motion. Moreover, elastomeric bearing assemblies have desirable longevity and maintenance characteristics when used in rotor applications, such as helicopter tail rotor applications. For example, elastomeric bearing assemblies do not require lubrication.

Referring generally to FIG. 1 and particularly to, e.g., FIG. 5 for illustrative purposes only and not by way of limitation, the following portion of this paragraph delineates example 11 of the subject matter, disclosed herein. According to example 11, which encompasses example 9 or 10, above, each of pair of bearing assemblies 140 comprises inner race 142, outer race 144, and elastomeric layer 146 between inner race 142 and outer race 144.

Bearing assemblies 140 therefore may be customized with selection of material of elastomeric layer 146 to result in desired flap motion characteristics.

In one or more examples, inner race 142 and outer race 144 are constructed of steel or other hard metal, and elastomeric layer 146 is constructed of rubber or other resilient elastomeric material.

Referring generally to FIG. 1 and particularly to, e.g., FIG. 5 for illustrative purposes only and not by way of limitation, the following portion of this paragraph delineates example 12 of the subject matter, disclosed herein. According to example 12, which encompasses example 11, above, each pair of bearing assemblies 140 further comprises additional elastomeric layer 147 and metallic shim 149 that is located between elastomeric layer 146 and additional elastomeric layer 147.

Bearing assemblies 140 therefore may be customized with selection of number and material of elastomeric layers and metallic shims to result in desired flap motion characteristics.

In one or more examples, additional elastomeric layer 147 is constructed of rubber or other resilient elastomeric material, and metallic shim 149 is constructed of steel or other metal.

Referring generally to FIG. 1 and particularly to, e.g., FIG. 5 for illustrative purposes only and not by way of limitation, the following portion of this paragraph delineates example 13 of the subject matter, disclosed herein. According to example 13, which encompasses example 12, above, elastomeric layer 146 and additional elastomeric layer 147 are coaxially arranged conical frustums, comprising respective single frustoconical central openings, having different volumes.

Accordingly, inner race 142 of each one of bearing assemblies 140 is elastomerically supported relative to outer race 144.

In one or more examples, pair of bearing assemblies 140 are described as conical bearing assemblies.

Referring generally to FIG. 1 and particularly to, e.g., FIG. 6 for illustrative purposes only and not by way of limitation, the following portion of this paragraph delineates example 14 of the subject matter, disclosed herein. According to example 14, which encompasses example 9 or 10, above, each of pair of bearing assemblies 140 comprises inner race 142, outer race 144, elastomeric layers 151 between inner race 142 and outer race 144, and metallic shims 148, interspersed among elastomeric layers 151.

Bearing assemblies 140 therefore may be customized with selection of number and material of elastomeric layers 151 and metallic shims 148 to result in desired flap motion characteristics.

In one or more examples, elastomeric layers are constructed of rubber or other resilient elastomeric material, and metallic shims are constructed of steel or other metal.

Referring generally to FIG. 1 and particularly to, e.g., FIG. 6 for illustrative purposes only and not by way of limitation, the following portion of this paragraph delineates example 15 of the subject matter, disclosed herein. According to example 15, which encompasses example 14, above, metallic shims 148 separate elastomeric layers 151 from each other.

As mentioned, bearing assemblies 140 therefore may be customized with selection of number and material of elastomeric layers 151 and metallic shims 148 to result in desired flap motion characteristics.

Referring generally to FIG. 1 and particularly to, e.g., FIG. 6 for illustrative purposes only and not by way of limitation, the following portion of this paragraph delineates example 16 of the subject matter, disclosed herein. According to example 16, which encompasses example 14 or 15, above, elastomeric layers 151 are coaxially arranged conical frustums, comprising respective single frustoconical central openings, having different volumes.

Accordingly, inner race 142 of each one of the bearing assemblies 140 is elastomerically supported relative to outer race 144.

In one or more examples, pair of bearing assemblies 140 are described as conical bearing assemblies.

Referring generally to FIG. 1 and particularly to, e.g., FIGS. 5 and 6 for illustrative purposes only and not by way of limitation, the following portion of this paragraph delineates example 17 of the subject matter, disclosed herein. According to example 17, which encompasses any one of examples 11 to 16, above, flap axle 114 of each of rotor-blade assemblies 112 extends through, and is fixed relative to, inner race 142 of each of pair of bearing assemblies 140 of a respective one of rotor-blade supports 108. Outer race 144 of each of pair of bearing assemblies 140 is fixed to a respective one of rotor-blade supports 108. Flap axle 114 is fixed relative to hub connector 116.

Inner race 142 thereby pivots with flap axle 114 and the rest of the corresponding rotor-blade assembly about central flap-axle axis 110 when the rotor-blade assembly flaps. That is, the entirety of the corresponding rotor-blade assembly flaps as a unitary structure, and other than the relative pitch movement of rotor blade 120 relative to hub connector 116, the bearing assemblies operatively constrain all other movement of the rotor-blade assembly relative to rotor hub 104.

Referring generally to FIG. 1 and particularly to, e.g., FIGS. 5 and 6 for illustrative purposes only and not by way of limitation, the following portion of this paragraph delineates example 18 of the subject matter, disclosed herein. According to example 18, which encompasses example 17, above, first clamp arm 125 comprises first axle hole 152, and second clamp arm 128 comprises second axle hole 153. Each of rotor-blade assemblies 112 further comprises bushing 150. Bushing 150 is positioned in first axle hole 152 or in second axle hole 153. Flap axle 114 extends through bushing 150, first axle hole 152, and second axle hole 153. Bushing 150 abuts inner race 142 of one of pair of bearing assemblies 140 of a respective one of rotor-blade supports 108.

Accordingly, the clamp arms, flap axle 114, and bushing 150 are able to be clamped together with the inner races of the bearing assemblies, thereby fixing rotor blade 120 to the inner races, such that the bearing assemblies serve to limit the flap motion of rotor blade 120.

Referring generally to FIG. 1 and particularly to, e.g., FIGS. 5 and 6 for illustrative purposes only and not by way of limitation, the following portion of this paragraph delineates example 19 of the subject matter, disclosed herein. According to example 19, which encompasses example 18, above, first axle hole 152 is larger than second axle hole 153. Bushing 150 is positioned in first axle hole 152.

Flap axle 114 fits in a close slip fit arrangement with second axle hole 153 and within the bore of bushing 150, while bushing 150 fits in a close slip fit arrangement with first axle hole 152, making for ease of assembly and ultimate fixing of central flap-axle axis 110 when clamped together.

Referring generally to FIG. 1 and particularly to, e.g., FIGS. 5 and 6 for illustrative purposes only and not by way of limitation, the following portion of this paragraph delineates example 20 of the subject matter, disclosed herein. According to example 20, which encompasses example 18 or 19, above, each of rotor-blade assemblies 112 further comprises first bearing-preload shim 154 and second bearing-preload shim 155, respectively positioned on opposing sides of second end 126 of torsion strap 122. Flap axle 114 extends through first bearing-preload shim 154 and through second bearing-preload shim 155. First bearing-preload shim 154 and second bearing-preload shim 155 are in contact with and are fixed relative to inner race 142 of a respective one of pair of bearing assemblies 140 of a respective one of rotor-blade supports 108.

The bearing-preload shims in effect sandwich torsion strap 122, such that torsion strap 122 with the bearing-preload shims are clamped together with the clamp arms, flap axle 114, and bushing 150, such that second end 126 of torsion strap 122 is fixed to flap axle 114. Accordingly, the entirety of a rotor-blade assembly is fixed relative to and pivots with the inner races of the bearing assemblies.

In one or more examples, multiple bearing-preload shims and bearing-preload shims of different thicknesses may be selected and installed on opposing sides of second end 126 of torsion strap 122 to provide any desired degree of preload of the bearing assemblies.

Referring generally to FIG. 1 and particularly to, e.g., FIGS. 5 and 6 for illustrative purposes only and not by way of limitation, the following portion of this paragraph delineates example 21 of the subject matter, disclosed herein. According to example 21, which encompasses example 20, above, flap axle 114 comprises fastener pair 156. Fastener pair 156 is configured to draw together under pressure first clamp arm 125, second clamp arm 128, bushing 150, inner race 142 of each one of pair of bearing assemblies 140 of a respective one of rotor-blade supports 108, first bearing-preload shim 154, second bearing-preload shim 155, and second end 126 of torsion strap 122 to fix hub connector 116 relative to inner race 142 of each one of pair of bearing assemblies 140 of a respective one of rotor-blade supports 108.

Fastener pair 156 operatively fixes the entirety of rotor blade 120 to the inner races of the bearing assemblies, so that the bearing assemblies function to limit the flap motion of rotor blade 120.

In one or more examples, fastener pair 156 comprises a bolt and a nut or a lockbolt (e.g., a pin and a collar).

Referring generally to FIG. 1 and particularly to, e.g., FIGS. 5 and 6 for illustrative purposes only and not by way of limitation, the following portion of this paragraph delineates example 22 of the subject matter, disclosed herein. According to example 22, which encompasses example 21, above, inner race 142 of each one of pair of bearing assemblies 140 of each one of rotor-blade supports 108 is a conical frustum, comprising a cylindrical central opening, leading end 168, and trailing end 170 that is larger than leading end 168. Leading end 168 is in contact with a respective one of first bearing-preload shim 154 or second bearing-preload shim 155 of a respective one of rotor-blade assemblies 112.

By being frustoconical with their narrower ends adjacent to the bearing-preload shims, the inner races of the bearing assemblies, when compressed by fastener pair 156 toward torsion strap 122 and against the bearing-preload shims, cause one or more elastomeric layers to be compressed between the inner races and the outer races of bearing assemblies 140.

Referring generally to FIG. 1 and particularly to, e.g., FIGS. 5 and 6 for illustrative purposes only and not by way of limitation, the following portion of this paragraph delineates example 23 of the subject matter, disclosed herein. According to example 23, which encompasses any one of examples 9 to 22, above, each of pair of bearing assemblies 140 is a tapered bearing assembly.

By being tapered bearing assemblies, the bearing assemblies are able to be preloaded when operatively installed.

In one or more examples, pair of bearing assemblies 140 are described as conical bearing assemblies.

Referring generally to FIG. 1 and particularly to, e.g., FIGS. 2 and 3 for illustrative purposes only and not by way of limitation, the following portion of this paragraph delineates example 24 of the subject matter, disclosed herein. According to example 24, which encompasses any one of examples 1 to 23, above, rotor hub 104 comprises central body region 136, through which rotation axis 106 passes. Rotor-blade supports 108 extend from central body region 136 away from rotation axis 106.

By extending from central body region 136, each of rotor-blade supports 108 provides structure for operative coupling of a corresponding one of rotor-blade assemblies 112.

Referring generally to FIG. 1 and particularly to, e.g., FIGS. 5 and 6 for illustrative purposes only and not by way of limitation, the following portion of this paragraph delineates example 25 of the subject matter, disclosed herein. According to example 25, which encompasses any one of examples 1 to 24, above, each of rotor-blade supports 108 comprises internal channel 138. Flap axle 114 of each one of rotor-blade assemblies 112 is perpendicular to internal channel 138 of a respective one of rotor-blade supports 108. Second end 126 of torsion strap 122 of each one of rotor-blade assemblies 112 extends into internal channel 138 of a respective one of rotor-blade supports 108 and is coupled to flap axle 114.

Presence of internal channel 138 enables second end 126 or torsion strap 122 to be coupled to flap axle 114 along central hub-connector axis 118 and thus along the vector of the corresponding centrifugal force resulting from the rotation of the corresponding rotor blade about rotation axis 106.

Referring generally to FIG. 1 and particularly to, e.g., FIG. 2 for illustrative purposes only and not by way of limitation, the following portion of this paragraph delineates example 26 of the subject matter, disclosed herein. According to example 26, which encompasses any one of examples 1 to 25, above, rotor assembly 100 further comprises pitch control mechanism 158, configured to selectively pivot rotor blade 120 about central hub-connector axis 118.

Pitch control of rotor blades enables selective adjustment of the thrust, produced by rotor assembly 100.

Referring generally to FIG. 1 and particularly to, e.g., FIG. 2 for illustrative purposes only and not by way of limitation, the following portion of this paragraph delineates example 27 of the subject matter, disclosed herein. According to example 27, which encompasses example 26, above, pitch control mechanism 158 comprises body 160 and pitch-control links 164. Body 160 is translatable along rotation axis 106. Body 160 comprises pitch control arms 162. Rotor blade 120 comprises pitch lever 166. Pitch-control links 164 interconnect respective ones of pitch control arms 162 of body 160 and pitch lever 166 of rotor blade 120.

Accordingly, the pitch of each of the rotor blades of rotor assembly 100 are controlled collectively when body 160 translates along rotation axis 106.

Figure 8:
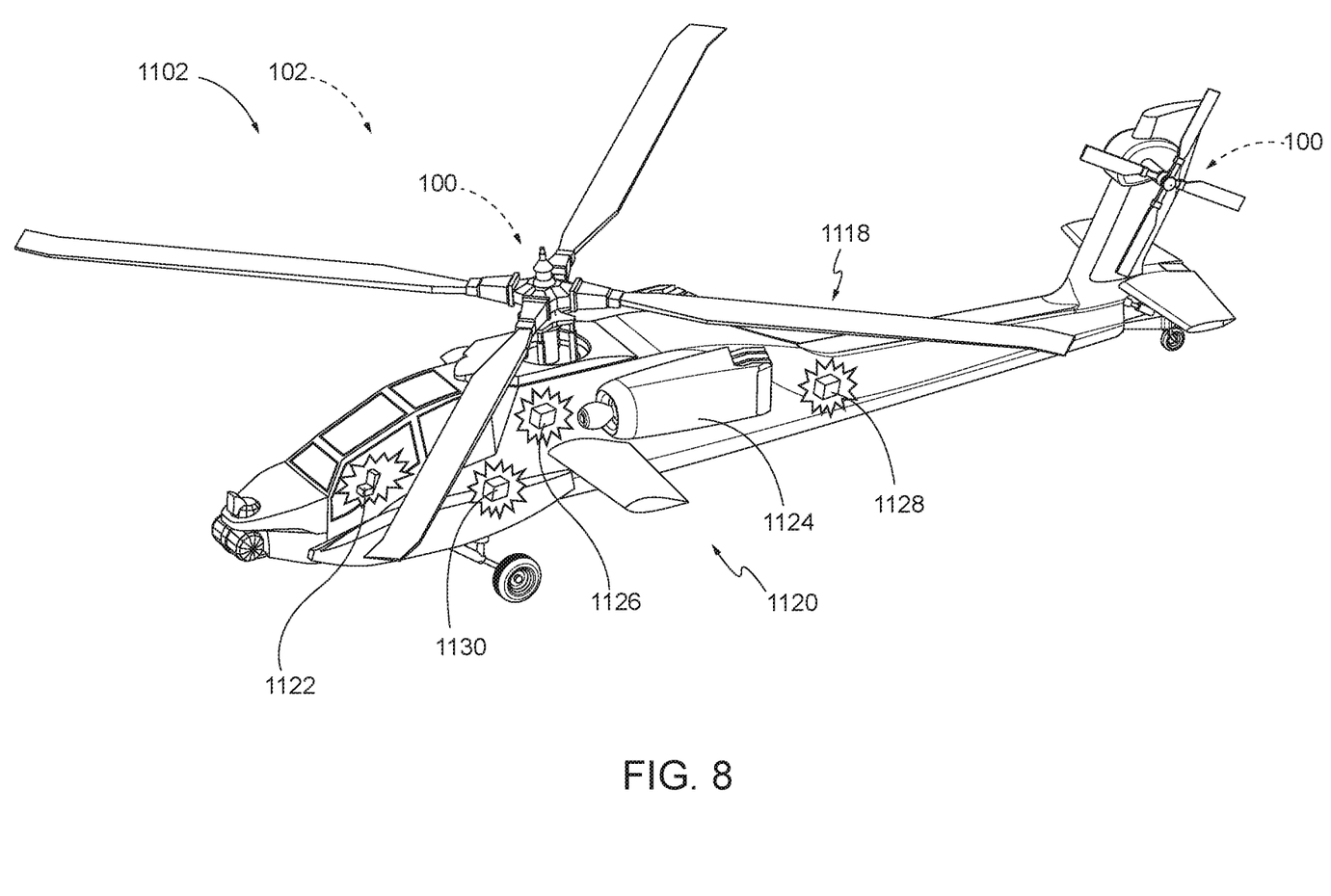
FIG. 8 is a schematic illustration of an aircraft.

Examples of the subject matter, disclosed herein may be described in the context of aircraft manufacturing and service method 1100, as shown in FIG. 7, and aircraft 1102, as shown in FIG. 8. In one or more examples, aircraft 1102 is rotorcraft 102. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

The invention claimed is:

1. A rotor assembly for a rotorcraft, the rotor assembly comprising:
a rotor hub, comprising rotor-blade supports; and
rotor-blade assemblies, each coupled to a respective one of the rotor-blade supports;

wherein:
the rotor hub has a rotation axis about which the rotor hub has a rotational symmetry of order N;
the rotor-blade supports are N in number; and
each of the rotor-blade assemblies comprises:
a flap axle, extending through the respective one of the rotor-blade supports and having a central flap-axle axis;
a hub connector, coupled to the respective one of the rotor-blade supports via the flap axle, pivotable relative to the respective one of the rotor-blade supports about the central flap-axle axis, and defining a central hub-connector axis that is perpendicular to the central flap-axle axis;
a rotor blade, coupled to the hub connector, pivotable relative to the hub connector about the central hub-connector axis, and, together with the hub connector, pivotable relative to the respective one of the rotor-blade supports about the central flap-axle axis; and
a torsion strap extending along the central hub-connector axis, having a first end, coupled to the rotor blade, and a second end, through which the flap axle passes.

2. The rotor assembly according to claim 1, wherein:
the hub connector comprises a connector shaft, a first clamp arm that extends from the connector shaft toward the rotor hub, and a second clamp arm that extends from the connector shaft toward the rotor hub;
the rotor blade is pivotable relative to the connector shaft about the central hub-connector axis; and
the flap axle extends through the first clamp arm and the second clamp arm of the hub connector.

3. The rotor assembly according to claim 2, wherein:
the rotor blade comprises a blade shaft;
the blade shaft comprises a blade-shaft internal cavity;
the connector shaft of the hub connector is positioned at least partially within the blade-shaft internal cavity; and
the blade shaft of the rotor blade is pivotable relative to the connector shaft of the hub connector about the central hub-connector axis.

4. The rotor assembly according to claim 3, wherein the blade shaft of the rotor blade is pivotally supported relative to the connector shaft of the hub connector via a bearing element, located inside the blade-shaft internal cavity.

5. The rotor assembly according to claim 4, wherein the bearing element comprises two bearing elements, spaced apart from each other along the central hub-connector axis.

6. The rotor assembly according to claim 2, wherein:
the connector shaft of the hub connector defines a connector-shaft internal cavity; and
at least a portion of the torsion strap is located inside the connector-shaft internal cavity.

7. The rotor assembly according to claim 2, wherein:
each of the rotor-blade supports comprises a pair of bearing assemblies;
the flap axle of each of the rotor-blade assemblies is received within and supported by the pair of bearing assemblies of the respective one of the rotor-blade supports; and
the pair of bearing assemblies is configured such that rotation of each of the rotor-blade assemblies relative to the respective one of the rotor-blade supports about the central flap-axle axis is angularly limited.

8. The rotor assembly according to claim 7, wherein each of the pair of bearing assemblies comprises:
an inner race;
an outer race;

elastomeric layers between the inner race and the outer race; and metallic shims, interspersed among the elastomeric layers.

9. The rotor assembly according to claim 7, wherein each of the pair of bearing assemblies comprises:
an inner race;
an outer race; and
an elastomeric layer between the inner race and the outer race.

10. The rotor assembly according to claim 9, wherein each pair of the bearing assemblies further comprises:
an additional elastomeric layer; and
a metallic shim that is located between the elastomeric layer and the additional elastomeric layer.

11. The rotor assembly according to claim 9, wherein:
the flap axle of each of the rotor-blade assemblies extends through, and is fixed relative to, the inner race of each of the pair of bearing assemblies of the respective one of the rotor-blade supports;
the outer race of each of the pair of bearing assemblies is fixed to the respective one of the rotor-blade supports; and
the flap axle is fixed relative to the hub connector.

12. The rotor assembly according to claim 11, wherein:
the first clamp arm comprises a first axle hole, and the second clamp arm comprises a second axle hole;
each of the rotor-blade assemblies further comprises a bushing;
the bushing is positioned in the first axle hole or in the second axle hole;
the flap axle extends through the bushing, the first axle hole, and the second axle hole; and
the bushing abuts the inner race of one of the pair of bearing assemblies of the respective one of the rotor-blade supports.

13. The rotor assembly according to claim 12, wherein:
the first axle hole is larger than the second axle hole; and
the bushing is positioned in the first axle hole.

14. The rotor assembly according to claim 12, wherein:
each of the rotor-blade assemblies further comprises a first bearing-preload shim and a second bearing-preload shim, respectively positioned on opposing sides of the second end of the torsion strap;
the flap axle extends through the first bearing-preload shim and through the second bearing-preload shim; and
the first bearing-preload shim and the second bearing-preload shim are in contact with and are fixed relative to the inner race of a respective one of the pair of bearing assemblies of the respective one of the rotor-blade supports.

15. The rotor assembly according to claim 14, wherein:
the flap axle comprises a fastener pair; and
the fastener pair is configured to draw together under pressure the first clamp arm, the second clamp arm, the bushing, the inner race of each one of the pair of bearing assemblies of the respective one of the rotor-blade supports, the first bearing-preload shim, the second bearing-preload shim, and the second end of the torsion strap to fix the hub connector relative to the inner race of each one of the pair of bearing assemblies of the respective one of the rotor-blade supports.

16. The rotor assembly according to claim 15, wherein:
the inner race of each one of the pair of bearing assemblies of each one of the rotor-blade supports is a conical frustum, comprising a cylindrical central opening, a leading end, and a trailing end that is larger than the leading end; and
the leading end is in contact with a respective one of the first bearing-preload shim or the second bearing-preload shim of a respective one of the rotor-blade assemblies.

17. The rotor assembly according to claim 1, wherein:
the rotor hub comprises a central body region, through which the rotation axis passes; and
the rotor-blade supports extend from the central body region away from the rotation axis.

18. The rotor assembly according to claim 1, wherein:
each of the rotor-blade supports comprises an internal channel;
the flap axle of each one of the rotor-blade assemblies is perpendicular to the internal channel of the respective one of the rotor-blade supports; and
the second end of the torsion strap of each one of the rotor-blade assemblies extends into the internal channel of the respective one of the rotor-blade supports and is coupled to the flap axle.

19. The rotor assembly according to claim 1, further comprising a pitch control mechanism, configured to selectively pivot the rotor blade about the central hub-connector axis.

20. The rotor assembly according to claim 19, wherein:
the pitch control mechanism comprises a body and pitch-control links;
the body is translatable along the rotation axis;
the body comprises pitch control arms;
the rotor blade comprises a pitch lever; and
the pitch-control links interconnect respective ones of the pitch control arms of the body and the pitch lever of the rotor blade.

* * * * *